(12) United States Patent
Weldemariam et al.

(10) Patent No.: US 11,443,008 B2
(45) Date of Patent: Sep. 13, 2022

(54) ADVANCED WEB PAGE CONTENT MANAGEMENT

(71) Applicant: International Business Machines Corporation, Armonk, NY (US)

(72) Inventors: Komminist Weldemariam, Nairobi (KE); Shikhar Kwatra, Morrisville, NC (US); John D. Wilson, League City, TX (US); Ashley D. Gritzman, Johannesburg (ZA); Tonya Nyakeya, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 16/004,656

(22) Filed: Jun. 11, 2018

(65) Prior Publication Data
US 2019/0377830 A1   Dec. 12, 2019

(51) Int. Cl.
*G06F 16/957* (2019.01)
*G06F 9/451* (2018.01)
*G06F 40/106* (2020.01)

(52) U.S. Cl.
CPC .......... *G06F 16/9577* (2019.01); *G06F 9/451* (2018.02); *G06F 2203/04803* (2013.01)

(58) Field of Classification Search
CPC .... G06F 16/9577; G06F 9/451; G06F 40/106; G06F 11/3438; G06F 3/0483; G06F 2203/04803; G06F 9/453; H04L 67/22
See application file for complete search history.

(56) References Cited

U.S. PATENT DOCUMENTS

| 7,231,405 | B2 | 7/2007 | Xia |
| 7,250,955 | B1* | 7/2007 | Beeman .................. G06F 9/542 |
|  |  |  | 345/592 |
| 7,716,205 | B1 | 5/2010 | Agapiev |

(Continued)

FOREIGN PATENT DOCUMENTS

| CN | 102207974 A | 10/2011 |
| CN | 104077333 A | 10/2014 |

OTHER PUBLICATIONS

International Search Report dated Sep. 23, 2019, issued in PCT/IB2019/054257, 9 pages.
(Continued)

*Primary Examiner* — Ariel Mercado
*Assistant Examiner* — Phoebe X Pan
(74) *Attorney, Agent, or Firm* — Scully, Scott, Murphy & Presser, P.C.; Barak Cohen

(57) ABSTRACT

Controlling contents of interfaces may include receiving multiple interfaces presented on a display screen. The multiple interfaces may include at least one primary task interface and each of the multiple interfaces may present at least one content item. A user engagement level with respect to content items presented via the multiple interfaces may be estimated. A degree of user effectiveness with respect to progression toward completing a primary task presented via the primary task interface may be determined. A content item may be selected from the multiple interfaces based on the user engagement level and the degree of user effectiveness. A presentation of the selected content item may be made in a controlled manner on an unused portion of at least one of the multiple interfaces.

20 Claims, 10 Drawing Sheets

(56) References Cited

U.S. PATENT DOCUMENTS

| | | | |
|---|---|---|---|
| 8,111,944 B2 | 2/2012 | Cheng et al. | |
| 8,381,127 B2* | 2/2013 | Singh | G06F 3/0481 715/791 |
| 8,442,974 B2 | 5/2013 | Young et al. | |
| 9,747,382 B1 | 8/2017 | Warman et al. | |
| 2004/0098462 A1* | 5/2004 | Horvitz | H04L 67/26 709/207 |
| 2004/0194110 A1* | 9/2004 | McKee | G06Q 10/10 719/310 |
| 2005/0021485 A1* | 1/2005 | Nodelman | G06Q 10/109 700/44 |
| 2007/0162907 A1* | 7/2007 | Herlocker | G06Q 10/10 718/100 |
| 2008/0215976 A1* | 9/2008 | Bierner | G06F 40/174 715/708 |
| 2008/0228910 A1 | 9/2008 | Petri | |
| 2009/0248594 A1* | 10/2009 | Castleman | G06F 9/453 706/11 |
| 2009/0313299 A1* | 12/2009 | Bonev | G06F 3/0481 |
| 2010/0198697 A1 | 8/2010 | Brown et al. | |
| 2011/0125739 A1* | 5/2011 | Wexler | G06F 16/9535 707/734 |
| 2011/0320529 A1* | 12/2011 | Mentchoukov | G06F 40/106 709/203 |
| 2013/0325463 A1* | 12/2013 | Greenspan | G06F 3/04842 704/235 |
| 2014/0085196 A1* | 3/2014 | Zucker | G06Q 30/0241 345/156 |
| 2014/0181634 A1* | 6/2014 | Compain | G06F 40/166 715/234 |
| 2014/0282677 A1 | 9/2014 | Mantell et al. | |
| 2014/0322677 A1* | 10/2014 | Segal | G09B 5/02 434/107 |
| 2014/0372415 A1* | 12/2014 | Fernandez-Ruiz | G06F 16/9038 707/722 |
| 2015/0189377 A1 | 7/2015 | Wheatley et al. | |
| 2016/0035230 A1 | 2/2016 | Spaulding | |
| 2016/0092518 A1* | 3/2016 | Grabar | G06Q 99/00 707/724 |
| 2016/0156693 A1 | 6/2016 | Lopez, Jr. | |
| 2016/0179969 A1* | 6/2016 | Greathouse | G06F 16/5838 707/710 |
| 2016/0225012 A1* | 8/2016 | Ha | G06Q 30/0277 |
| 2016/0292744 A1 | 10/2016 | Strimaitis et al. | |
| 2017/0221064 A1* | 8/2017 | Turgeman | G06F 21/32 |
| 2017/0322692 A1 | 11/2017 | Barak et al. | |
| 2017/0344568 A1 | 11/2017 | Jacob et al. | |
| 2018/0032491 A1 | 2/2018 | Heo et al. | |
| 2018/0239521 A1* | 8/2018 | Bastide | G06F 3/0481 |
| 2018/0336578 A1* | 11/2018 | Sato | G06Q 30/0201 |
| 2019/0286756 A1* | 9/2019 | Sweeney | G06F 40/16 |
| 2019/0335006 A1* | 10/2019 | George | G06N 3/084 |
| 2021/0232478 A1* | 7/2021 | M Y | G06F 9/451 |

OTHER PUBLICATIONS

Lagun, D., et al., "Understanding and Measuring User Engagement and Attention in Online News Reading", WSDM'16, Feb. 22-25, 2016, http://www.dcs.gla.ac.uk/~mounia/Papers/wsdm2016.pdf, Accessed on Apr. 20, 2018, 10 pages.

Disclosed Anonymously, "Generating a User-Specific Reduced Content Webpage", an IP.com Prior Art Database Technical Disclosure, IP.com No. IPCOM000252355D, Jan. 5, 2018, 39 pages.

Examination Report dated Mar. 1, 2022 received in GB2019706.7, 6 pages.

* cited by examiner

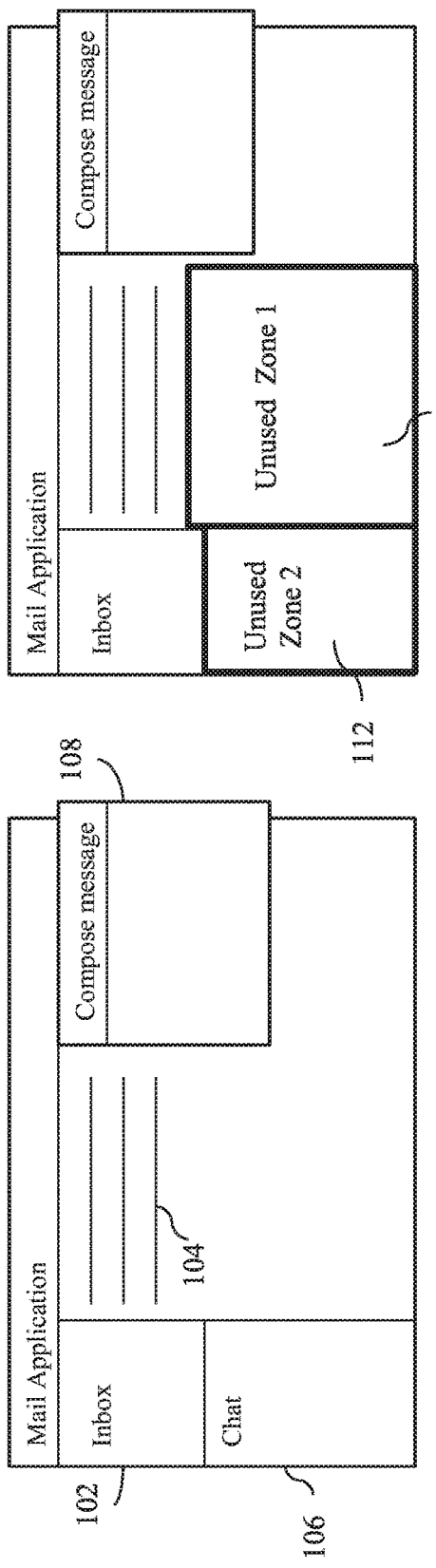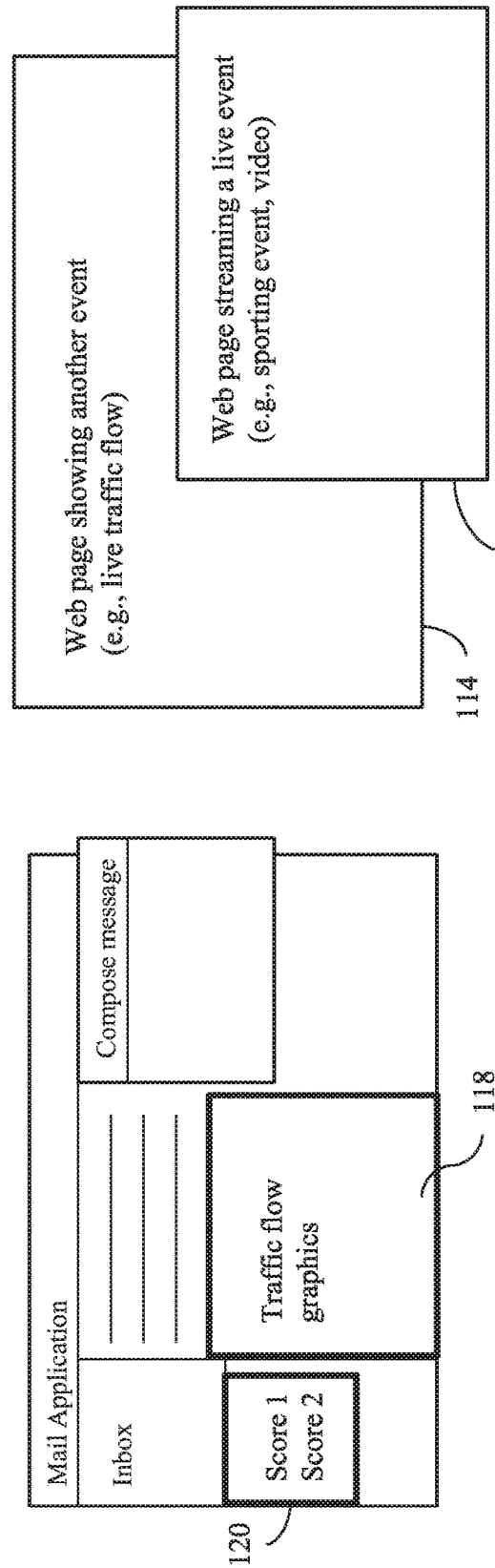

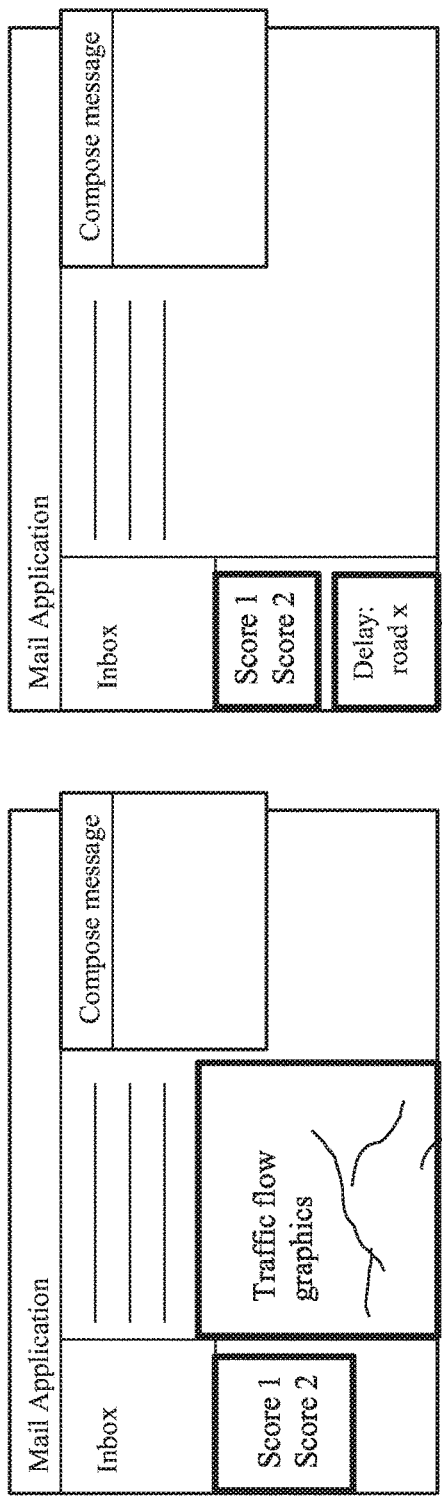
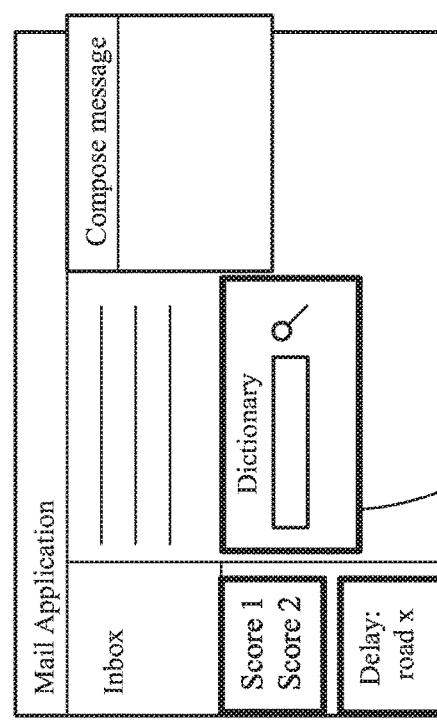
FIG. 2A
FIG. 2B
FIG. 2C

ADVANCED WEB PAGE CONTENT MANAGEMENT

FIELD

The present application relates generally to computers and computer applications, and more particularly to interface, browsers and web page management.

BACKGROUND

A display screen may display multiple windows of content, e.g., web pages, tabs or interfaces open in one browser, in multiple browser instances, or in multiple browsers. The multiple windows of content may be opened for purposes such as communicating on social media, listening to music, browsing, performing online tasks and activities (e.g., editing online and/or web content, interacting with backend, cloud service, or another system processing), monitoring (e.g., monitoring for news events, sporting events, reports for web traffic, weather, and/or another item), entertainments and/or other purposes.

Some of the opened tabs, web pages, or interfaces may be more important or time sensitive than others, for instance, due to the user activity or task, nature and characteristics of the content or information being displayed on the web page or interface. However, for example, for some users, the cumulative effect of the time spent in switching tabs or web pages may not be affordable, for example, as a user may need to switch from one tab to another tab to find the tab that the user is interested in. Switching from one content to another (e.g., presented via a tab, a web page or interface) may affect a user's engagement level with respect to the user's primary task or activities. For example, a user can lose attention with respect to the user's current task and the user's sentiments, cognitive states and emotional states (e.g., mood, tiredness) may change in relation to the ongoing activities. Such events may cumulatively affect the degree of user effectiveness toward completing the user primary task.

BRIEF SUMMARY

A method and system of controlling contents of interfaces may be presented. The method, in one aspect, may include receiving multiple interfaces presented on a display screen. The multiple interfaces may include at least one primary task interface. In one aspect, each of the multiple interfaces may include at least one content item. The method may also include estimating a user engagement level with respect to content items presented via the multiple interfaces. The method may further include determining a degree of user effectiveness with respect to progression toward completing a primary task presented via the primary task interface. The method may also include selecting a content item from the multiple interfaces based on the user engagement level and the degree of user effectiveness.

A system of controlling contents of interfaces, in one aspect, may include at least one hardware processor coupled with at least one memory device. The at least one hardware processor may be operable to receive multiple interfaces opened via a computing device. The multiple interfaces may include at least one primary task interface. Each of the multiple interfaces may include at least one content item. The at least one hardware processor may be further operable to estimate a user engagement level with respect to content items presented via the multiple interfaces. The at least one hardware processor may be further operable to determine a degree of user effectiveness with respect to progression toward completing a primary task presented via the primary task interface. The at least one hardware processor may be further operable to select a content item from the multiple interfaces based on the user engagement level and the degree of user effectiveness in relation to the primary task(s). The at least one hardware processor may be further operable to control or trigger controlling of a presentation of the selected content item on an unused portion of at least one of the multiple interfaces.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 1A-1D illustrate web page or interface content management in one embodiment.

FIGS. 2A-2C illustrate transforming web page or interface content in one embodiment.

DETAILED DESCRIPTION

Figure 3A:
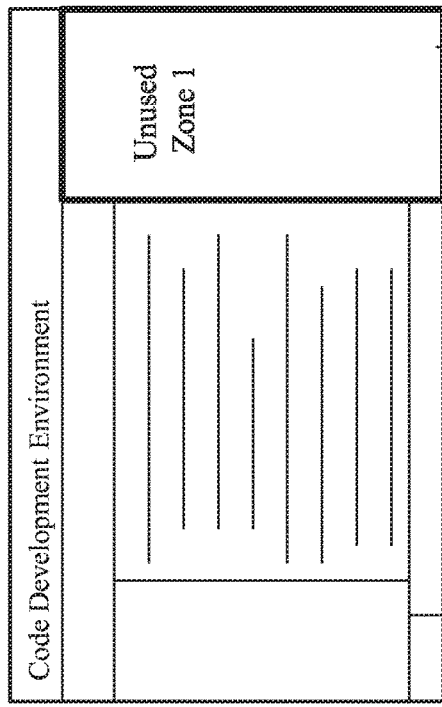
FIGS. 3A-3D show examples of detecting an unused part or portion of an interface or web page in one embodiment.

A system, method and techniques may be provided that intelligently manage interface or web page arrangements on a display (e.g., browser window or windows) presenting content items, for example, so as to improve a task completion rate of an activity being performed on an interface, web page or the like. In some aspects, a user's effectiveness may be predicted with respect to tasks or activities other than the user's primary tasks or activities, for example, for improving the user's overall task completion rate, for instance, with an acceptable quality threshold. A content item may be dynamically selected or aggregated from a web page and arranged such that the content item would not affect the overall task productivity of the user. An unused part or portion of at least one interface or web page may be determined to present a content item determined to be relevant to the user's activities. In some aspects, at least one interface or web page may be split to present the content item determined to be relevant to the user's activities. In some aspects, content items displayed or presented on one or more interfaces or web pages, which may contribute to ineffective outcomes (e.g., user's predicted effectiveness) may be learned and dynamically de-prioritized or suggested to be removed (or removed) from an interface or web page.

A method and/or system in some embodiments may intelligently manage and control content items of web pages and/or interfaces, for instance, to improve a user's overall task completion, for instance, with an acceptable quality threshold. Intelligently managing and controlling the content items may be based on predicting user effectiveness and analyzing a content relevance. For example, multiple web pages or the like (e.g., interfaces that include content displayed or presented online) displayed or presented on a display screen may be identified. At least one of the multiple web pages (or interfaces) is associated with a user's primary task being performed, for example, in real-time. Each interface or web page displays or presents at least one content item. A user's engagement level may be estimated or determined with respect to the displayed or presented content items and the one or more primary tasks of the user (e.g., with the content item presented on a web page or interface associated with the user's primary tasks). The user's context and cognitive state may be analyzed and the degree of user effectiveness may be determined in relation to progression towards completion of the one or more primary tasks. One or more content items determined to be relevant may be selected from one or more web pages (interfaces) based on analyzing content item relevance and the degree of user effectiveness. In some aspects, a method and/or system may present or display, and/or control the selected one or more content items determined to be relevant, on unused part or parts of at least one web page (or interface), for example, which may improve the user's overall task completion rate.

As more and more tabs, web pages or interfaces open with explicit content items that are part of online user activities or tasks, user effectiveness with respect to the user's primary activity or activities (task or tasks), for example, the completion of a primary activity and the quality associated with the primary activity may increase or decrease. A method and/or system according to some embodiments intelligently manage a web page or interface to improve a user task completion, for example, by displaying or presenting selected relevant content items for a user, for example, on unused part or parts of at least one web page, based on predicted user effectiveness. In some embodiments, the user effectiveness may be predicted as a function of attributes such as user progression score, context analysis, task or activity characteristics, content item characteristics, for example, in an area where a task is being performed that requires improving the user's effectiveness (e.g., completion of a task). In some aspects, intelligently controlling the content item displays may improve overall task completion rate with an acceptable quality threshold. In some aspects, acceptable quality attributes of the task may be given or may be determined based on analyzing task specification details, e.g., obtained from a collaborative project management application such as an issue tracking system. The acceptable quality thresholds or attributes may be specified on a task metadata or may be extracted from previously ranked quality thresholds or attributes on similar tasks.

FIGS. 1A-1D illustrate web page or interface content management in one embodiment. FIG. 1A shows a web page or interface which presents an electronic mail (e-mail) application, and a primary task of composing an email. A mail application shown in FIG. 1A, for instance, may include an area that shows content related to an inbox 102, an area with messages 104 and another area that allows a user to utilize a chat function 106. A pop-up screen or panel 108 may be populated or shown for composing a new message. FIG. 1B shows two unused zones that are identified in the web page (or interface) showing the mail application, for example, identified as a primary task interface or web page. The vacant space in Unused Zone 1 110 arises from having only a few e-mail in the inbox, and Zone 2 112 is determined to be unused by analyzing the historical behavior of the user to conclude that the user does not use the chat application using the area at 106. FIG. 1C illustrates analyzing multiples web pages or tabs (or interfaces) to assess user engagement with the content items in order to determine relevant content, and subsequently to predict the user effectiveness. In this example, one or more browsers or the like may also have other web pages or interfaces opened, for example, one associated with a live traffic flow 114 and another associated with a streaming event 116. Responsive to determining that the relevant content enhances the user effectiveness, the content or information of the content 118, 120 may be displayed in the unused zones as illustrated in FIG. 1D. In some aspects, the information may be derived content (e.g., updated current scores 120 of the teams playing in the sporting event rather than the streaming video of 116), which is derived from the content determined to be relevant.

In one aspect, a computer process or thread implementing the method may run, for example, in the background, while the user interacts with the content items on or across one or more web pages, and continuously analyze each opened web page or interface where the user has visited at least one time. The computer process may further profile each web page based on the analysis results and other external metadata. The web page (interface) profile and other external metadata may provide a basis for determining content item relevance or importance (and hence the corresponding web page or interface that is presenting or displaying the content item) and assigning a content item relevance score in relation to at least one primary task of the user. In some aspects, the current user context and cognitive state may be also determined that may affect a degree of user effectiveness level in completing a user's primary task.

The system may dynamically rank a web page based on the web page profile and content analytics that may provide further details for determining the relevance score of the content item with respect to the user tasks or user effectiveness towards completing one or more primary tasks. The ranking and relevance scores of the web page (and content item) may change as the user continues interacting (and thus engaging) with one or more content items, task profile, and detected content item characteristics. In some embodiments, IBM® Watson Content Analytics from International Business Machines Corporation (IBM)®, Armonk, N.Y., may be used to collect and analyze content items and/or web pages.

In some embodiments, a method and/or system may estimate the user engagement, for example, which may be measured at least in part by the frequencies of visiting a web page, the time spent per each visit (e.g., reading), user's interactions with a content item, analysis of eye movement, gaze patterns, the profile of the webpage, and/or other factors. The method of estimating the user engagement may be done using custom trained machine learning models or algorithms. By way of example, the Markov chain algorithm described below may be employed to analyze the user reading patterns.

In one implementation of an embodiment, in the below algorithm, $V_i$ is a random variable representing the portion of the content item viewed at the i-th time, $v_i$ is the observed areas of interest viewed at the i-th time, and n is the number of times user transitioned from one portion of the content item to another (or from one page to another if the transition is between web pages). The probabilities $P(V_i=v_i)$ and $P(V_i=v_i|V_{i-1}=v_j)$ can be directly estimated from user activity stream data, e.g., by counting the number of transitions from $v_j$ to $v_i$ and ensuring proper normalization ($v \in O$ P (V= v|V_j)=1). "O" represents possible state outcomes, which may include {Click, Pause, Scroll Up, Scroll Down, Zoom-in, Zoom-out, Type, Read, or another}. Index i−1 represents a view time (e.g., i−1$^{th}$ time) before the view at i-th time. Similarly, j represents the view at j-th time, where i, j∈{1, 2, . . . , n} and where j>i.

$$P(V_{1:n}) = \sum_{k=1}^{K} \alpha_k P_k(V_1 = v_1) \prod_{i=2}^{n} P_k(V_i = v_i | V_{i-1} = v_{i-1})$$

The above representation in one embodiment may model to estimate the average user engagement. For instance, the modeling to estimate the user engagement can be done using a variant of Markov chains (e.g., discrete mixture of Markov chain), which can take into consideration different user engagement patterns, which may be present in the user data. In the above algorithm, $P_k(V_1)$ and $P_k(V_i|V_{i-1})$ represent the probability distributions, $\alpha_k$ is a mixture weight and k indexes the mixture component.

The system may also estimate the current progression of the user towards a completion of a task or a set of tasks based on the user progress so far. In some embodiments, a method of estimating the current progression is based on analyzing data streams that may include the number of code commits (or lines of code written), the number of transactions submitted, analysis of documents generated or submitted (e.g., number of words written in a word document, portable document format (pdf) document submitted, and/or others). The method of estimating the current progress may further be based on similarity analysis from cohort of users and cohort of tasks. For example, a total number of tasks, a number of users assigned to the tasks and completed tasks may be utilized to determine the user's progress in comparison to others and respective completion rates for reference points.

User effectiveness represents the degree of the effectiveness of a user in terms of the ability of the user to complete or engage in one or more user primary tasks. A method and/or system in some embodiments may estimate or predict the user ability to complete a specified task in a predefined time with acceptable quality attribute or attributes (which may be predefined) based on the estimated progression, estimated degree of the user engagement, analyzing historical data (of similar task cohort) and given acceptable quality attributes of the task, and analyzing task specification details (e.g., obtained from a collaborative project management application, which for example, may provide services such as version control, source code management functionality and other services). An acceptable quality threshold or attribute (or thresholds or attributes) may be specified on a task metadata or may be extracted from previously ranked quality thresholds or attributes on similar tasks. In some aspects, task metadata may be obtained by analyzing data from monitoring activities, for example, for information such as a user's progression rate, tasks assigned, work done in stipulated time period, time spent on respective web pages and web content viewed.

Determining the user effectiveness, for example, estimating or predicting the user's ability to complete a specified task in a predefined time may further take into consideration the analysis of the user motivation, working style, and prior knowledge or expertise level of the user in the given task or tasks (or similar task or tasks). Such information may be made available in a user profile. A user profile may be constructed or built in some embodiments.

Based on the estimated progression of a user u (u∈U) on one or more tasks T ($Prog_{u \in U}(T)$) and measured quality attributes, a method and/or system in some embodiments may determine the degree of user effectiveness in relation to progression toward completion of the one or more user primary tasks ($Eff_{u \in U}(T)$). $Prog_{u \in U}(T)$ represents the progression of user u for corresponding task T. For example, user effectiveness, $Eff_{u \in U}(T)$, may take on a value of "Very High (5)", "High (4)", "Medium (3)", "Low (2)", or "Poor (1)." User effectiveness may be represented in another form or value. If the estimated degree of user effectiveness is below a threshold Δ (($Eff_{u \in U}(T)<\Delta$), a method and/or system in some embodiments may automatically or autonomously trigger a content selection that may further dynamically select one or more content items from a content web page (interface) store using one or more relevant content selection factors. The one or more relevant content selection factors may include content relevance score, user profile (e.g., user context, cognitive state, and/or other user factors), engagement level, and task profile.

For example, in FIG. 1, an example of a primary task is illustrated as composing an email, and the effectiveness of the user (user effectiveness) may be quantified by the number of words typed per minute. If a method and system in some embodiments detects that the users is constantly changing tabs to check the progress of a streaming event, or monitor traffic (e.g., because the user needs to travel to a location), then the method and/or system may determine that displaying the some data associated with the streaming event (e.g., sporting event score) or traffic information may enhance the user efficiency by not needing to switch between tabs. On the other hand, if the method and/or system detects that a form (e.g., a visualization) of a presentation or display (e.g., a graph or map) is distracting the user which is reducing the quality of the primary task (e.g., increase in the number of spelling mistakes), then the method and/or system may reduce the form (e.g., graph or map) to a simple informational data, e.g., traffic data such as "delay at road x". If the method and/or system still detects that the quality of the email is poor (e.g., the user is still making many spelling mistakes), the method and/or system may automatically or autonomously add a dictionary lookup in an unused space, e.g., which may help to enhance the productivity of the user.

FIGS. 2A-2C illustrate transforming web page or interface content in one embodiment. For example, reducing the content to another form (e.g., a graphical traffic map to simple text data, a stock activity graph to a simple share price), may help the user from being distracted from the user's primary task. For instance, a graphical display at 202 in FIG. 2A may be transformed to another form, for example, shown at 204. FIG. 2C shows an example of adding a dictionary lookup window 206 or like, which may improve the process of editing (e.g., improve spelling), which may increase the quality of the task of composing an email as an example.

In some embodiments, the content items may take the form of widgets, which are live and interactive. A widget, for example, may be an application, or component of an interface, that enables a user to perform a function or access a service, and may be provided as a graphical user interface (GUI) element with which a user may interact. For example, both the traffic widget and sports event widget may update in real-time. If the user clicks on the widget, the user may be taken to the web page from where the content originates.

In some embodiments, a method and/or system, which may intelligently manage selected one or more relevant content items, may also detect one or more unused parts of at least one web page (or interface). In some embodiments, a method and/or system may split or section at least one web page or interface to display the selected one or more relevant content item. The characteristic and location of content items may be determined in runtime based on analysis of an unused part of the web page or GUI.

Figure 3B:
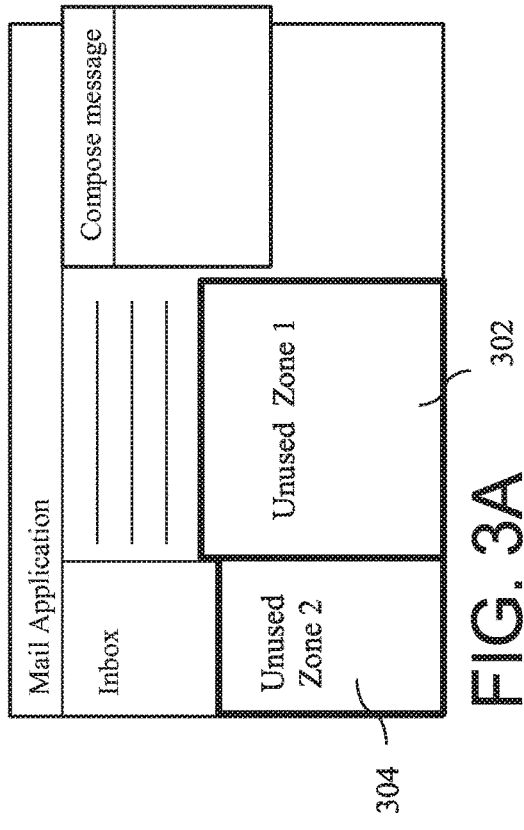

FIGS. 3A-3D show examples of detecting an unused part or portion of an interface or web page in one embodiment. FIG. 3A shows an interface or web page of an e-mail application, and for example, a primary task of composing an e-mail message. An unused part detection function, for instance, identifies two zones 302, 304, which may be used to display relevant content from another interface or web page. In this example, a blank space (or the like in a user interface display representation) may be identified as an unused portion. FIG. 3B shows an interface or web page of software or code development application, and a primary task of writing software code on the interface or web page of the code development application. In this example, consider that the code development application's interface uses a portion of the display window (e.g., right side column shown at 306) for providing an application feature, for example, a notification menu, or another feature. An unused part detection function may identify that the user does not usually use (or is not interested in) this particular application feature when employing this application to write code. Such determination, for example, may be performed by looking at or analyzing historical data of the user's usage of the application. In this example scenario, an unused part detection function may identify the notification menu portion as unused portion 306.

Figure 3C:
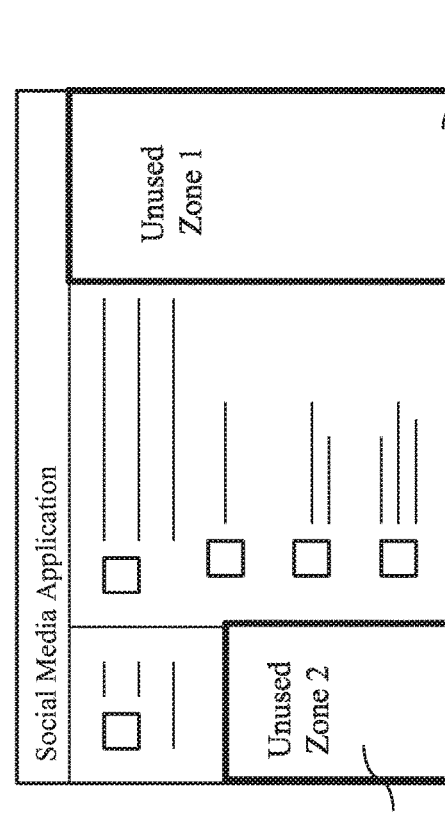

Referring to FIG. 3C, consider that an interface or a web page is of an application that presents or streams a video, allowing a user to watch a video via the interface. A primary task is identified as watching a video. Consider also that the interface of this application includes a comments section (e.g., for allowing a user to enter comments) and/or recommendation section (e.g., which may recommend other videos for the user to watch), for example, displayed simultaneously with the primary task section (showing the current video being watched). In this example, the unused part detection function may determine that the user may not be interested in the recommendation shown in the portion shown at 308 (labeled Zone 1), or the comments in the portion shown at 310 (labeled Zone 2). For instance, the unused part detection function may monitor user activities on the interface and determine that the user has not used those features of this application. The method and/or system in some embodiments may use those portions 308, 310 to display other relevant content.

Figure 3D:
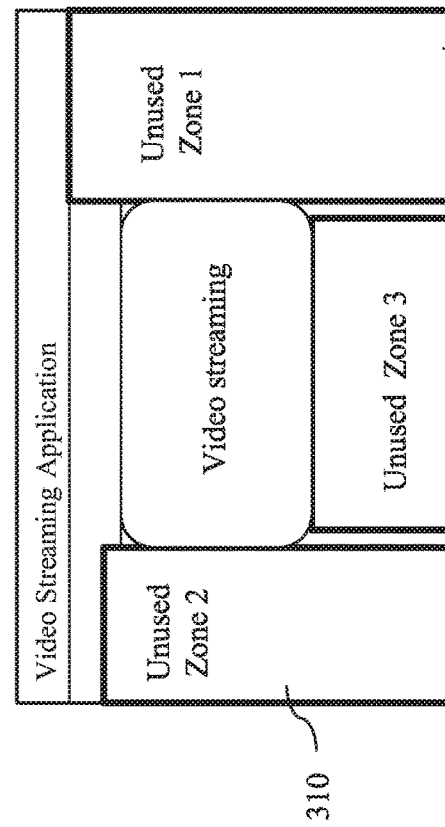

Referring to FIG. 3D, consider that an interface or a web page is of a social network application, which may feed news on a user's social network page. In this example, the unused part detection function may determine that the user may not be interested in some of the notifications appearing on a portion of the user's social network page, for example, shown at 312 (labeled Zone 1), and/or a portion showing links to other pages, shown at 314 (labeled Zone 2). For instance, a method and/or system in some embodiments may determine an unused part, by implementing facial recognition detecting and mood analysis of image and/or other data received via a device such as a webcam camera, e.g., in correlation with the web content being monitored. As another example, a method and/or system in some embodiments may implement user gaze detection to map a line of sight with a portion of content currently being viewed and/or monitored, along with user clicks or the like (via an input device) and an amount of time spent related to a particular content Like features may allow the method and/or system to understand a level of interest of a user pertaining to a specific localized content on the page.

Thus, the system and/or method in some embodiments may automatically detect unused parts of an interface or a web page and use those portions to provide or arrange content on a GUI that may increase user's effectiveness in processing a primary task.

Figure 4:
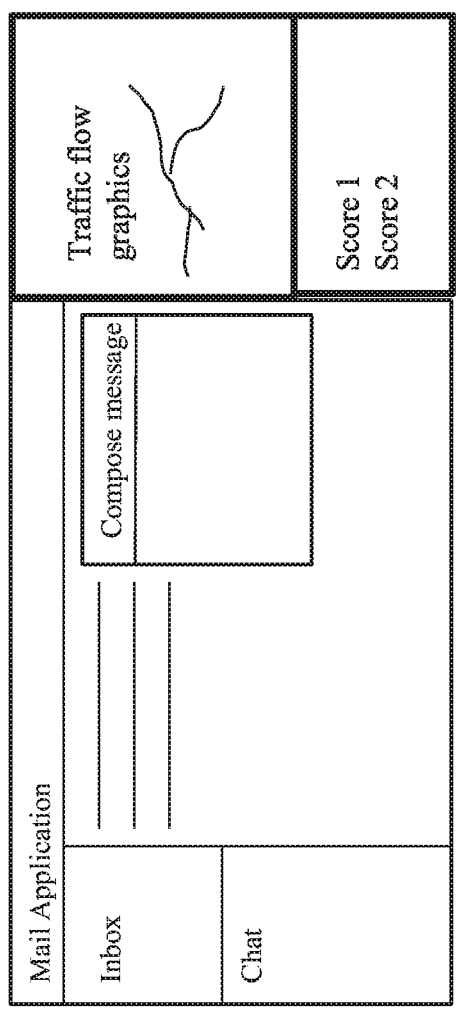
FIG. 4 shows an example of an interface or web page, on which a user may manually allocate a zone in one embodiment.

In some embodiment, a user may choose to manually allocate a zone on a primary web page or interface where relevant content from other web pages can be displayed. FIG. 4 shows an example of an interface or web page, on which a user may manually allocate a zone in one embodiment. In some embodiments, the method and/or system may automatically determine the relevant content. In some embodiments, the relevant content may be selected by a user. For example, a webpage may be divided into content segments or sections. An interactive graphical user interface (GUI) which can displace the contents locally or in hypertext markup language (HTML) form can be used to dynamically position the content or can be specified by the user with a respective position on a display screen, for example, using a virtual intermediate layer.

Figure 5:
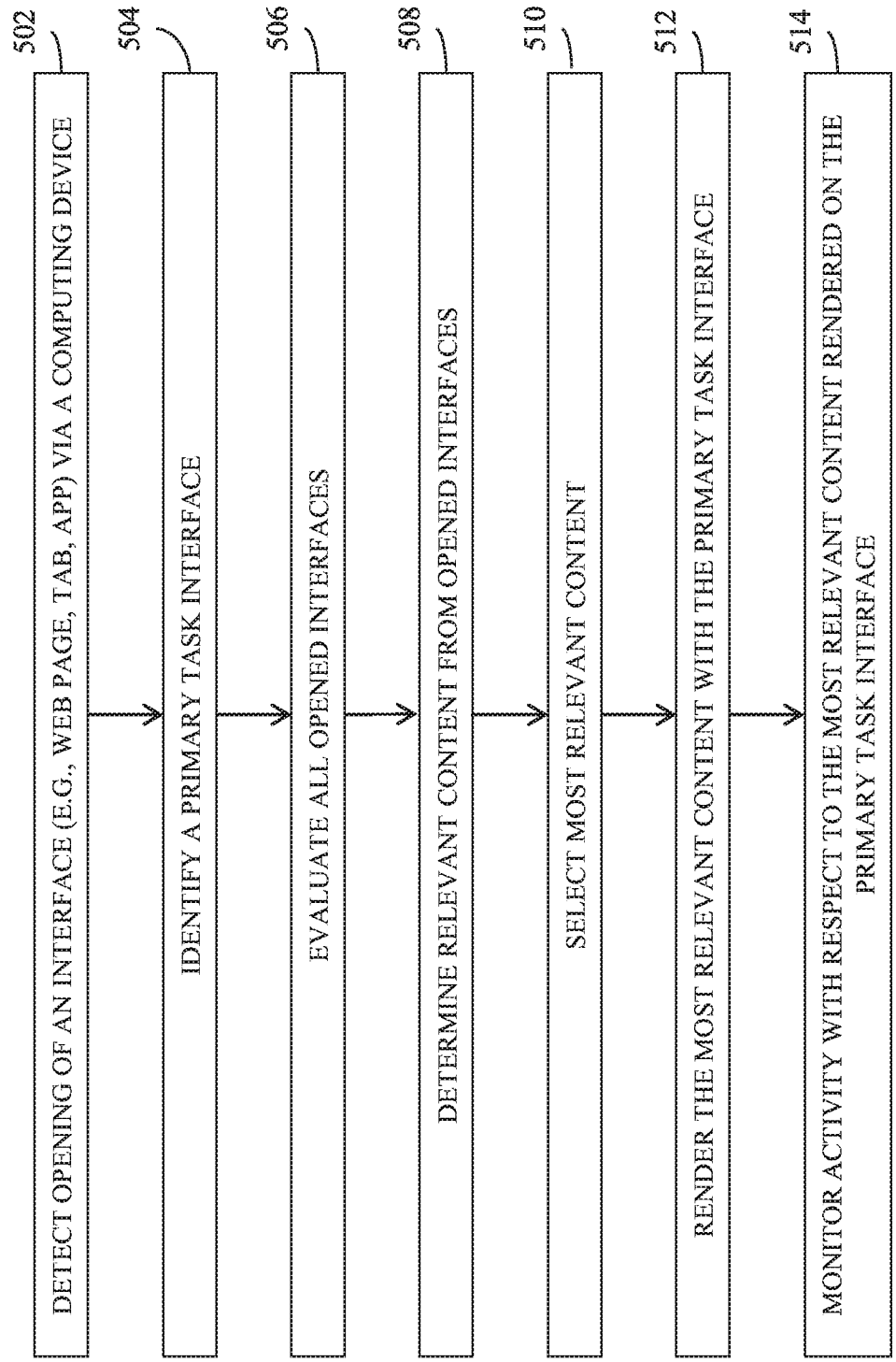
FIG. 5 is a diagram illustrating a method of intelligently managing a web page or interface in one embodiment.

FIG. 5 is a diagram illustrating a method of intelligently managing a web page or interface in one embodiment. The method may be performed by at least one hardware processor. At 502, an opening of a web page (or interface) or a tab in a browser, may be detected or received. For instance, a user may open a new tab or web page or interface, for instance, to browse or navigate. A browser or the like displaying or presenting the new tab or web page or interface receives a location identifier such as a uniform resource location (URL) from where the new tab or web page or interface may be retrieved and presented, for example, on a user interface display.

At 504, a primary (also referred to as a priority) tab or web page or interface among the web pages, tabs, and/or interfaces which are opened is identified. In some aspects, a primary page may be identified as the user's most viewed and/or operated page, where the content can be specified and allocated at different unused zones on a display screen. Initially, in some aspects, a primary page can be set manually by a user or can be identified dynamically based on time spent by the user and the functions performed on the page.

At 506, all opened web pages or tabs or interfaces or the like, are evaluated or re-evaluated. For example, in some embodiments, a feedback learning mechanism may be provided as part of a machine learning aspect, which understands activities such as the frequency of gazing, operating at particular web content, tasks being assigned to the user, and/or other activities, which may lead to changing interests or level of engagement of the user.

At 508, for 1 to n opened web pages or tabs or interfaces (e.g., for each of the opened web pages or tabs or interfaces, for example, determined at 506), relevant content from the web page (or tab or interface) is determined. In some embodiments, relevant content of a web page, tab or interface may be determined based on a web page ranking or relevant scoring determined based on external metadata. Webpage ranking may be performed based on features such as operating on a particular web page content, time spent on a page, a frequency of use of a page. For instance, a web page having higher number of activities, time spent and frequency may be ranked higher. A web page ranking may determine the priority of web pages. A relevant scoring may rank portions or content segments within a particular web page, for example, based on a user's focus (e.g., pattern of eye gaze, input activity (e.g., clicking, mouse hover, and/or others), and/or others) associated with a portion or segment.

In some embodiments, relevant content of a web page, tab or interface may be determined as follows. User effectiveness may be estimated. The content of the opened web pages (or tabs or interfaces) may be analyzed, for example, by performing a text classification or another analysis. Such analysis may determine topics of interest to the user, for example, based on history of the topics the user has previously visited or viewed may be determined. A user context estimation may be performed, which determines web pages (or tabs or interfaces or the lie), in which the user spends most time, for example, based on historical user behavior with respect to web pages (or tabs or interfaces), and determines similar web pages (or tabs or interfaces) that are in the currently opened set. A web page (or tab or interface) may be determined to be similar to another web page (or tab or interface), for instance, if the content of the web page (or tab or interface) meets a similarity threshold to the content of another web page (or tab or interface). A user cognitive state analysis may be performed that determines user attention and/or interest, for example, by detecting the user's eye movement, gaze, input device activity such as a mouse activity, and/or facial micro expressions. In some embodiments, a machine learning mechanism with input features (e.g., the user's eye movement, gaze, input device activity such as a mouse activity (e.g., clicks, hover-over), frequency, time, tasks assigned, level of engagement, and/or facial micro expressions) may train a machine learning model to determine a relevant scoring of specific content. Examples of a machine learning algorithm, which may train a machine learning model may include, but are not limited to, linear regression, logistic regression, neural networks such as deep learning neural networks, and/or others. Supervised machine learning, for example, trains a model based on a labeled training data set, and to be able to predict an outcome given an input feature vector or input feature values.

At 510, most relevant and/or effective information or content may be culled or selected from a group of relevant content determined at 508. In some embodiments, more than one content item may be selected as being most relevant. For instance, content ranked highest, or a number of content ranked highest may be selected.

At 512, the primary web page or tab or interface may be rendered, for example, with the most relevant and/or effective information determined at 510 from another web page or tab or interface. For instance, the content from another web page may be overlayed over a portion or portions of the primary web page, for example, over an unused part of the primary web page.

At 514, user activity may be monitored and re-evaluated. For instance, user consumption of the content overlayed over a portion of the primary web page may be monitored, and/or user opening a new web page (or tab or interface) may be detected. Based on the monitored activities, the method and/or system in some embodiments may re-evaluate the determination of the most relevant content and may dynamically update the presentation of the content on the unused part or parts of the primary web page (tab or interface). For example, the processing at 510 and 512 may iterate or repeat based on new activities of the user.

In some embodiments, the method and/or system may reconfigure itself based on a single user or multiple users. For instance, if multiple users are logging in to that same computer or even on different computers, then, based on their respective credentials such as biometric information (finger detection), voice detection, facial detection to login to the computer, the method and/or system may adjust the relevant content to display or overlay on a primary interface or web page or tab based on the specific user. For instance, every individual user may have the respective user's own preferences or set of relevant contents and the users may be detected to identify or re-configure the settings.

The method and/or system may create a separate cognitive state or identity for each user in order to configure the prioritized content by extracting relevant effective information from multiple web pages. Hence, the content determined to be of interest to a specific user (e.g., based on their interests, cognitive heuristics) may be dynamically displayed or presented responsive to retrieving or receiving that content, for example, from a database (e.g., which may be stored remotely (e.g., in a cloud database) or locally). In this way, an intelligent decision of displaying or presenting a customized content for a specific user can be made. The content presented or displayed may be more personalized and may pertain to a particular user's cognitive interests and history.

Figure 6:
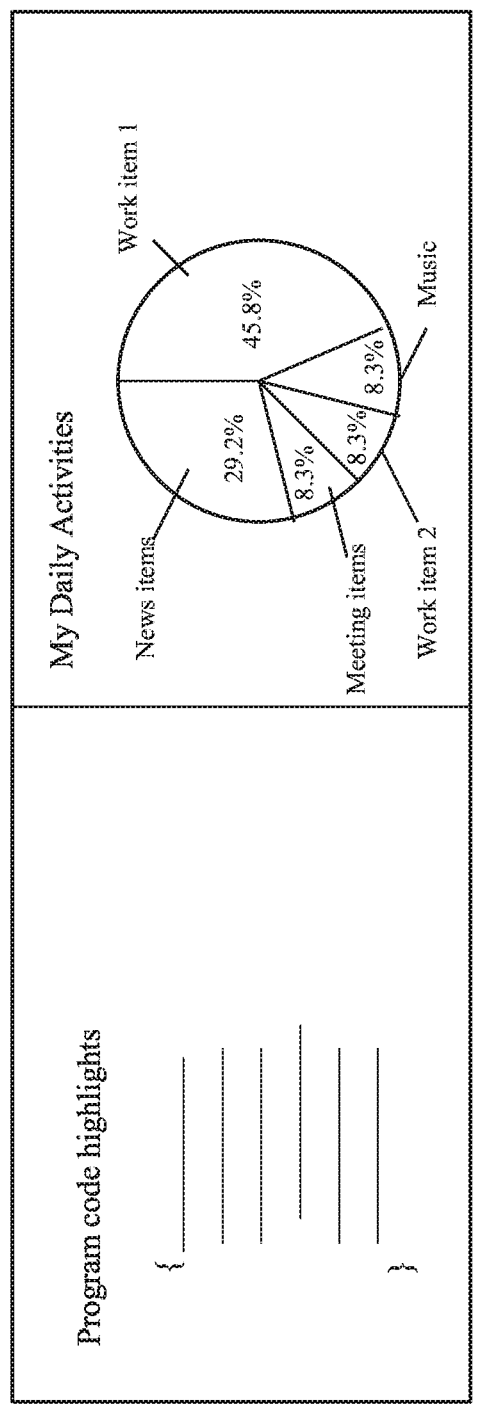
FIG. 6, as an example, illustrates visualization charts and highlighted dynamic code created, for instance, on unused sections of a web page, in one embodiment.

In some embodiments, the portion or portions of the web page that presents or displays unused content may be utilized to highlight the user's activities, completed task and a rendering of the user's task to complete, for instance, in the form of a visualization chart or charts. Such visualization, displayed on the unused portions or sections, for example, created dynamically on the web page, may enable dynamic evaluation of the user's progress with respect to tasks completed and activities being performed by the user. As an implementation example, backend Javascript may enable the creation of dynamic web pages and visualization charts, which highlight the user's effectiveness and time spent on the respective web pages along with tasks under progress. FIG. 6, as an example, illustrates visualization charts and highlighted dynamic code created, for instance, on unused sections of a web page, in one embodiment. The visualization highlights user's activities along with time spent on different tasks and various web sources and/or items. The highlighted code shows an example of a code, e.g., dynamic Javascript code, which may be created, for example, in a backend layer to show an illustrative graphical representation of user's progress, tasks and time spent on different web page content for self-analysis, shown in the unused portion to provide or present (e.g., to a user) user a broad perspective of the user's progress.

As described above, a method and/or system in some embodiments may include estimating the degree of user effectiveness. In some embodiments, the estimating of the degree of user effectiveness may be configured to continuously learn the user effectiveness with respect to the displayed (or presented) content item or items on one or more unused parts of the web page in association with the predicted effective or ineffective outcomes. The learning may use gaze patterns analysis, and identify the areas of the web page or interface, on which the user most frequently focuses. The learning may include cautioning against, de-prioritizing or suggesting to remove content item or items, or a web page to be displayed, that are associated with predicted ineffective outcomes for the user. For instance, responsive to determining that displaying a video content is known to be associated with a poor outcome with respect to the user's primary task being performed on a primary interface or web page, that content item may be suggested to be removed, or moved to a less relevant category. Thus, for example, if a detected impact of the content item or items is decreasing the rate of the user progression or completion ability, a method and/or system in some embodiments may dynamically de-prioritize or suggest that the displayed content item or items be removed or not displayed. For instance, referring to FIG. 1, displaying a traffic map may be determined to distract the user from performing the user's primary task on an opened interface (primary interface or web page), for example, of composing an e-mail message. In response, the method and/or system may reduce the graphical live traffic map to a simple text data. If the method and/or system still determine a reduction in effectiveness of the user, despite the change in the display form, then the method and/or system may remove that information (text data) altogether.

In some embodiments, a cloud memory storage system may store the activities and cognitive states of the respective users. The method and/or system may determine personalized display choices based on the specific user logging onto a computer at a particular point of time.

While the above examples described a web page content management, the method and/or system may also be implemented to manage content in native applications deployed and/or running on a computing device such as a mobile phone, tablet, personal computer, laptop and/or another device. In a similar manner, the method and/or system may detect unused parts of the user interface (e.g., GUI) of a particular app or application, and insert relevant content from other apps or applications running on the computing device, into this unused space of the particular app or application.

In some aspects, a computing device may be an edge computing device, for instance, where the selective personalized content can be cached for multiple users for quick retrieval and displayed (dynamic GUI) in a prioritized fashion according to the engagement level of those respective users on their respective web sites, interfaces, and/or tabs of interest.

Figure 7:
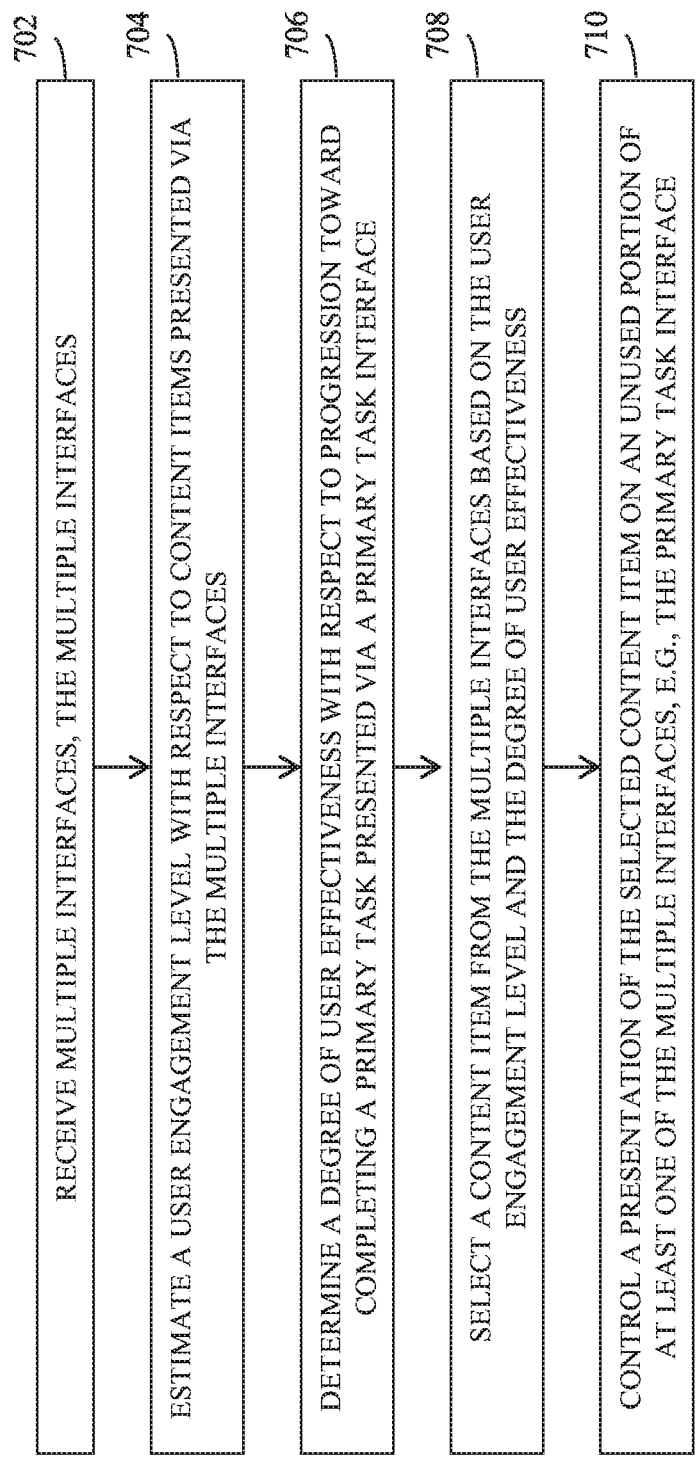
FIG. 7 is a flow diagram illustrating a method of intelligently managing and controlling contents of interfaces (e.g., web pages) in one embodiment.

FIG. 7 is a flow diagram illustrating a method of intelligently managing and controlling contents of interfaces (e.g., web pages) in one embodiment. The method may improve a user overall task completion, for instance, with an acceptable quality threshold, which may be predefined. The method may include predicting user effectiveness and analyzing content relevance. The method may be performed or executed by at least one hardware processor.

At 702, multiple interfaces (e.g., one or more web pages, tabs, pages of apps (applications), and/or or another interface) presented, for example, on a display screen may be received. The multiple interfaces may include at least one primary task interface and each of the multiple interfaces may present at least one content item.

At 704, a user engagement level may be estimated with respect to content items presented via the multiple interfaces. For instance, the user's activity or interaction with each of the multiple interfaces, for example, including interaction with the primary task interface, may be analyzed to determine the user engagement level with respect to content items presented on the primary task interface and other interfaces of the multiple interfaces. In some aspects, a user engagement level may be computed per user, and may include multiple values, e.g., computed for each content. For example, a user engagement level may include multiple values based on the priority of the content and the positioning of the respective content for a user. As another example, a user engagement level may include multiple values based on the priority of the content and the positioning of the respective content for each user of a group of users.

In some embodiments, estimating or determining a user engagement level may include analyzing the user interaction patterns, for example, with the multiple interfaces, estimating the user context (e.g., the current activity of the user, current state of the user) and determining the user cohort (e.g., progression state, understanding level, cognitive state) with respect to content items on the multiple interfaces. User context refers to information or attributes associated with a user. User cohort refers to a group of users (e.g., viewing a screen together). A method and/or system in some embodiments may detect preferences of respective users (e.g., by automated detection mechanisms such as a facial recognition technique) and may dynamically alter the content based on an averaging mechanism.

In some embodiments, a user engagement level may be estimated at least based on a user's frequency of navigating to an interface of the multiple interfaces, time spent per visit to the multiple interfaces, a degree of user interactions with the multiple interfaces, and user eye movements and gaze patterns. For instance, user engagement level may be computed with respect to a specific web page content, for example, which may be calculated using a likelihood probability.

At 706, a degree of user effectiveness may be determined with respect to progression toward completing a primary task presented via the primary task interface. In some aspects, the degree of user effectiveness with respect to progression toward completing a primary task presented via the primary task interface may be determined at least based on user motivation, working style, and user's expertise level associated with the primary task. For instance, user activities may be tracked via monitoring sources such as sensor feeds and one or more applications (e.g., for receiving calendar, schedule, agenda items), to compute user's progression rate. In some aspects, machine learning may take as input at least some of the tracked information to computer a user's progression rate. Information or data may be extracted, e.g., from social media or the like to determine working style and expertise. In some aspects, the degree of user effectiveness may be determined based on an estimated progression rate of the user on one or more tasks and the measured quality attributes.

At 708, a content item from the multiple interfaces may be selected based on the user engagement level and the degree of user effectiveness. In some aspects, a degree of user effectiveness may be used as an input to content selection, which may decide or optimize which content items are best suited for the user, for instance, from multiple candidate content items. In some aspects, a content item or content items may be selected without a measure of the user effectiveness. In one aspect, content relevance of each of the multiple interfaces may be determined, for example, from a user engagement level, for example, determined by analyzing the user's activity or interest with the content items associated with, or presented on, the multiple interfaces. In some aspects, the content item may be selected further based on content profile, task profile, characteristics of content items, user context and a user cognitive state. So for example, a content item may be selected based on one or more content selection factors such as a content relevance score, user profile (which may include user context, user cognitive state, and/or other information associated with the user), engagement level, and task profile. In some aspects, content relevance score may be determined based on an estimated engagement level and content profile, characteristics of content items, user context and cognitive states. In selecting one or more content items, some of the above specified variables can be turned on or off (used or not used), for example, depending on a constraint considered in the selection process. For example, a constraint may include increasing the user effectiveness.

At 710, a presentation of the selected content item on an unused portion of at least one of the multiple interfaces may be controlled. For instance, the selected content item may be displayed on the unused portion of the primary task interface. In some aspects, controlling the presentation of the selected content item may include transforming a display of the selected content item from one form to another. For instance, graphical displays may be transformed to simpler text form. In some aspects, controlling a presentation of the selected content item on an unused portion of at least one of the multiple interfaces may increase a rate at which the primary task is completed. Such arrangement of content item display may improve the user overall task completion rate.

In some aspect, a visualization chart may be constructed dynamically based on a user's progression of the primary task performed via the primary task interface. For example, a dynamic visualization chart may be constructed or rendered dynamically based on the progress of the user with respect to the task handled or taken up by the user within a predefined time period T.

In some aspects, the method may also include detecting one or more unused portions in the primary task interface, for instance, for displaying one or more content items determined to be relevant. For instance, one or more content items may be from a popular page or interface, where the user frequently visited.

In some aspects, the method may also include continuously learning the degree of user effectiveness with respect to presented content item on the unused portion. Learning may include monitoring user gaze patterns and identifying the user's focus on areas of the primary task interface. Based on the learning, the content item presented on the unused portion may be de-prioritized or removed. In another aspect, based on the learning, the content item may be suggested or recommended to be de-prioritized or removed.

In some aspects, a multi-layer machine learning classification model (e.g., deep learning) may be provided or implemented, which is able to predict the most relevant content and identify the unused sections of an interface such as a web page from a number of opened interfaces (e.g., web pages). The content may be dynamically managed, for example, to ameliorate the user's task completion rate and improve the efficiency of completing a task performed on an interface (e.g., webpage). For instance, a method and/or system may identify one or more primary tasks, present (e.g., display or cause to display) and control content item or items (e.g., determined to be relevant) on unused parts of at least one interface (e.g., webpage). Such controlling of the content item presentation may improve the user's overall task completion rate.

In some aspects, unused zones in individual interfaces (e.g., web pages) can be utilized by adding content from a separate interface (e.g., web page), for example, so that all information that the user wants to frequently access is consolidated in one area. A method and/or system, for example, which may implement a cognitive learning aspect and an understanding of contextual activity of the user, may allow for an improved task completion rate while meeting predefined quality thresholds and attributes. A method and/or system in some embodiments may also dynamically generate and add (or insert) to an unused portion of an interface, content such as one or more graphs or another visualization (and/or another information form), for example, which may show users progress and list of activities currently being performed or have been performed. Such dynamic content may show a realistic progress over time to indicate user's efficiency on one or more tasks performed via one or more interfaces.

Figure 8:
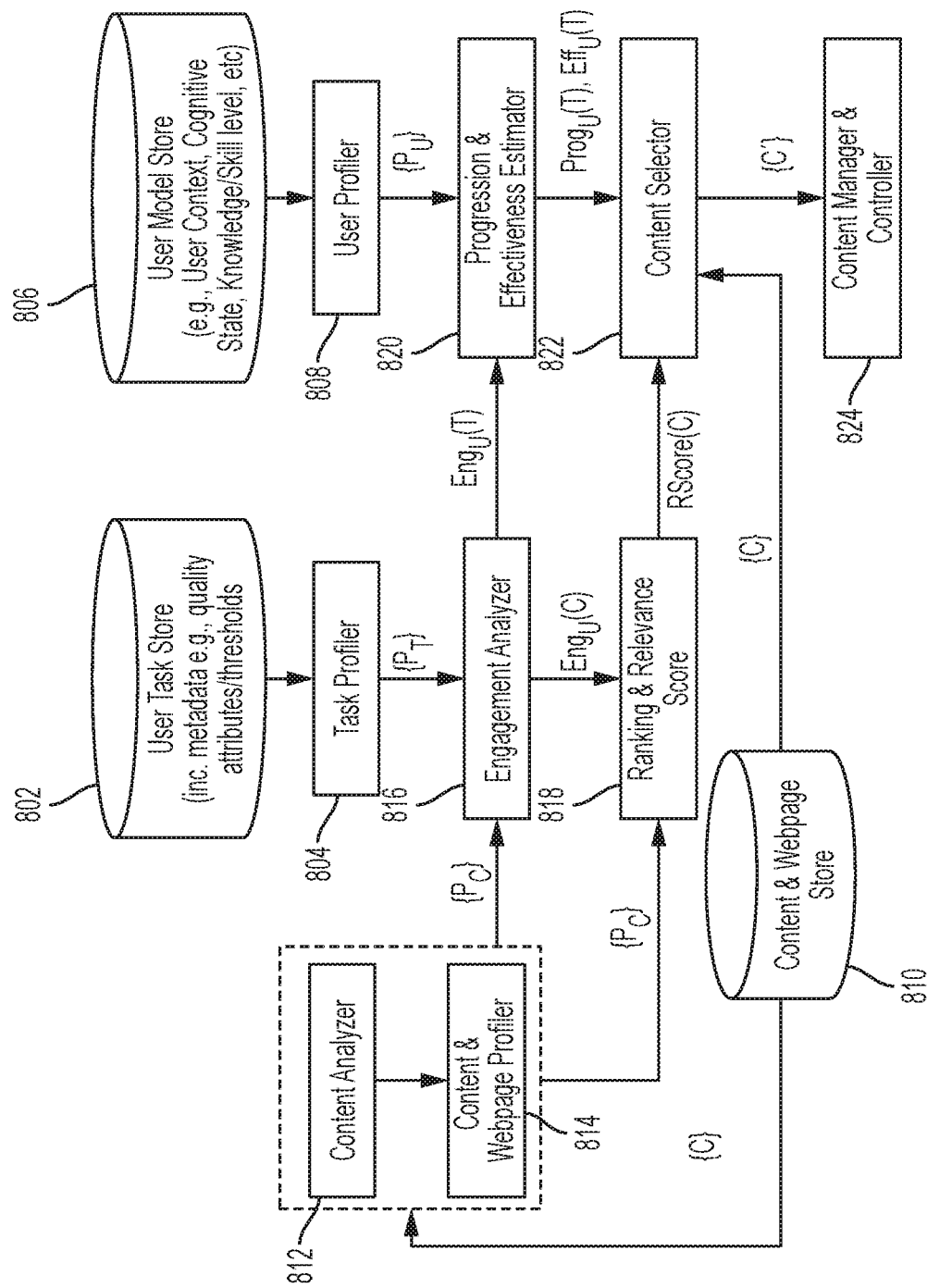
FIG. 8 is a diagram illustrating components of a system that may intelligently control contents of interfaces in one embodiment.

FIG. 8 is a diagram illustrating components of a system that may intelligently control contents of interfaces in one embodiment. $\{U\}$ may represent a set of users, $\{T\}$ may represent a set of user tasks, and $\{C\}$ may represent a set of content items in one or more interfaces, for example, web pages, tabs, and/or apps, and/or another type of interface. $\{P_u\}$ may represent a profile of a corresponding user U. $\{P_c\}$ may represent a profile of a corresponding content C. $Eng_U(C)$ may represent an engagement of a user U per content C. $Eng_U(T)$ may represent an engagement of a user U per task T. $Prog_U(T)$ may represent progression of a user U on a corresponding task T. $Eff_U(T)$ may represent an effectiveness of a user U on corresponding task T. RScore(C) may represent a relevance score of content item C. Plurality of such values may be stored for a respective plurality of users, tasks, and content items.

Components shown in FIG. 8 may include hardware components or software components executing the one or more hardware processors and performing functions described herein. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. In another aspect, the processor may be programmed with one or more of the various functionalities described herein.

A user task database or store (e.g., storage device) 802 may store information such as metadata associated with tasks. Metadata information may include quality attributes and thresholds associated with a task, for example, a quality level the task when completed needs to meet.

A task profiler 804 may create a task profile (e.g., per task) based on the information stored in the user task store 802. For example, a task profile associated with task T specifies a quality attribute associated with that task T.

A user model database or store (e.g., storage device) 806 may store information associated with users. Such information may include user context, cognitive states of the users, knowledge levels of users, and/or other information.

A user profiler 808 may create a user profile (e.g., per user) based on the information stored in the user model database or store 806. For examples, a user profile associated with user U may specify user context, cognitive state and knowledge level associated with that user U.

A content and interface (e.g., web pages, app interfaces) database or store (e.g., storage device) 810 may store a plurality of content and interfaces, for example, web pages and/or the like.

A content analyzer 812 may perform analysis (e.g., text analysis, image analysis) on interface content (e.g., content to be displayed or present via an interface such as a web page) and a content profiler 814 may create a content profile. A content profile may be created per interface (e.g., web page), for example, for each web page or interface content received from the content store 810. In some embodiments, a content profile may store the content itself, metadata associated with the content such as the Uniform Resource Locator (URL) of the content, characteristics of the content, usage history, historical effectiveness (e.g., if available) and/or other information or attributes associated with the content.

An engagement analyzer 816 may receive a content profile and a task profile, and may determine an engagement level of a user U on a task T. An engagement level of user U on a task T may be determined based on information such as the user's activities associated with a web page or interface via which the user is performing the task T, which information, for instance, may be specified in one or more of the content profile and the task profile.

The engagement analyzer 816 also may determine an engagement level of a user U on content C. An engagement level of user U on content C may be determined based on information such as the user's activities associated with a web page or interface, which includes content C.

A ranking and relevance score component 818 may receive a content profile and an engagement level of a user U on content C, and compute a relevant score associated with content C. For instance, a level of engagement (e.g., of user U on content C) may be computed, for example, as described above. A content item being analyzed and an engagement level may be fed with re-configurable input weights to a deep learning neural network algorithm with implicit and/or explicit learning feedback. Such deep learning neural network algorithm may have trained or learned the weights, for instance, based on historical data or training data set, to be able to predict a relevant score give input features comprising a content item and an engagement level with respect to the content item. A trained neural network may predict a relevant score, e.g., on a re-configurable scale of 1-5.

A progression and effectiveness estimator 820 may receive a user profile corresponding to a user U and an engagement level of a user U on content C, and may determine progression of a user U on a task T. The progression and effectiveness estimator 820 may also determine effectiveness of a user U on a task T.

A content selector 822 receives a relevant score associated with content C, progression of a user U on a task T and effectiveness of a user U on a task T, and selects content from a group of content items. For example, one or more rules may specify which content to select, based on such factors.

A content manager and controller 824 may control a presentation or display of the selected content (C'), for instance, on a primary task interface.

Figure 9:
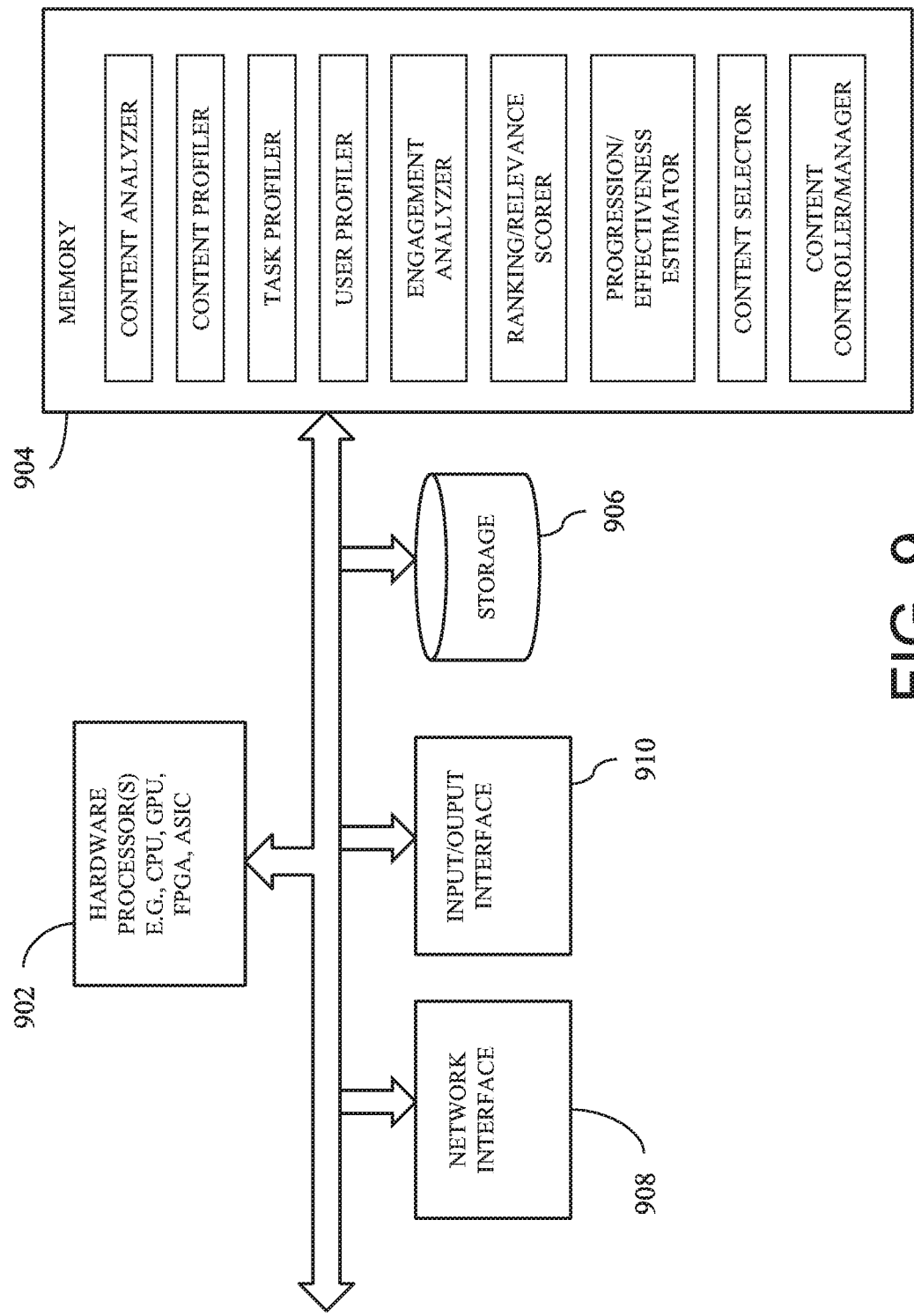
FIG. 9 is a diagram showing components of a system in one embodiment that may intelligently manage and/or control content presented on one or more interfaces such as web pages.

FIG. 9 is a diagram showing components of a system in one embodiment that may intelligently manage and/or control content presented on one or more interfaces such as web pages. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and may perform various functionalities described herein and may control presentation of content on one or more interfaces such as web pages. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 904 may, for example, store instructions and/or data for functioning of the one or more hardware processors 902, and may include an operating system and other program of instructions and/or data. The one or more hardware processors 902 may receive input comprising content, user and task information. For instance, at least one hardware processor 902 may select and control content based on various functionalities, for example, described herein. In one aspect, data associated with tasks, users and content may be stored in one or more storage devices 906 or received via a network interface 908 from a remote device, and may be temporarily loaded into the memory device 904 for determining content and controlling content. The one or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
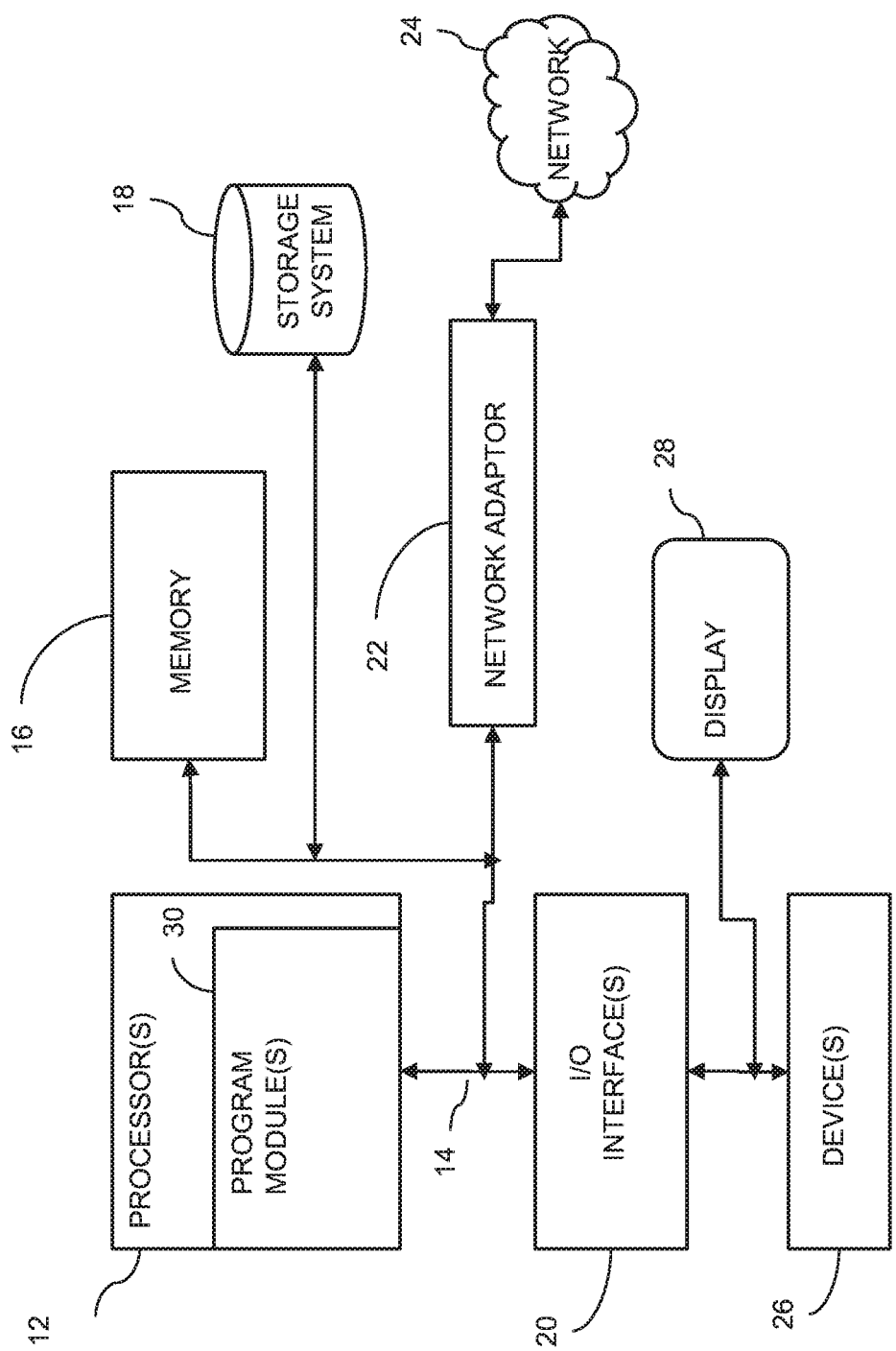
FIG. 10 illustrates a schematic of an example computer or processing system that may implement system according to one embodiment.

FIG. 10 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling contents of interfaces, the method performed by at least one hardware processor, comprising:
   receiving multiple interfaces presented on a display screen, each of the multiple interfaces being where a user has visited at least one time, the multiple interfaces comprising at least one primary task interface, each of the multiple interfaces presenting at least one content item, the at least one primary task interface being an interface of an application different from applications of rest of the multiple interfaces;
   estimating a user engagement level with respect to content items presented via the rest of the multiple interfaces based on the user interaction with the content items across the rest of the multiple interfaces, the user interaction including the user transitioning from one of the multiple interfaces to another one of the multiple interfaces;
   determining a degree of user effectiveness with respect to progression toward completing a primary task presented via the primary task interface; and
   selecting a content item from the rest of multiple interfaces based on the user engagement level and the degree of user effectiveness, the content item including information from at least one of the rest of the multiple interface, to which the user transitioned a number of times from the primary task interface,
   the selecting performed based on determining that the degree of user effectiveness with respect to progression toward completing the primary task is below a threshold.

2. The method of claim 1, wherein the interfaces comprises web pages.

3. The method of claim 1, further comprising controlling a presentation of the selected content item on an unused portion of at least one of the multiple interfaces.

4. The method of claim 3, wherein the controlling the presentation of the selected content item comprises transforming a display of the selected content item from one form to another.

5. The method of claim 3, wherein the controlling a presentation of the selected content item on an unused portion of at least one of the multiple interfaces increases a rate at which the primary task is completed.

6. The method of claim 1, wherein the estimating a user engagement level with respect to content items presented via the multiple interfaces, comprises:
   determining user interaction patterns with respect to the content items;
   estimating user context; and
   determining user cohort.

7. The method of claim 1, wherein the user engagement level is estimated at least based on a frequency of navigating to an interface of the rest of the multiple interfaces, time spent per visit to the rest of the multiple interfaces, a degree of user interactions with the rest of the multiple interfaces, and user eye movements and gaze patterns.

8. The method of claim 1, wherein the content item is selected further based on content profile, task profile, characteristics of content items, user context and a user cognitive state.

9. The method of claim 1, wherein the degree of user effectiveness with respect to progression toward completing a primary task presented via the primary task interface, is determined at least based on user motivation, working style, and user's expertise level associated with the primary task.

10. The method of claim 1, wherein a visualization chart is constructed dynamically based on a user's progression of the primary task performed via the primary task interface.

11. The method of claim 1, further comprising detecting one or more unused portions in the primary task interface.

12. The method of claim 11, further comprising continuously learning the degree of user effectiveness with respect to presented content item on at least one of the unused portions.

13. The method of claim 11, wherein the learning further comprises monitoring user gaze patterns and identifying the user's focus on areas of the primary task interface.

14. The method of claim 13, further comprising de-prioritizing the content item presented on the unused portion based on the learning.

15. A computer program product comprising a computer readable storage medium having program instructions embodied therewith, the program instructions readable by a device to cause the device to:
receive multiple interfaces presented on a display screen, each of the multiple interfaces being where a user has visited at least one time, the multiple interfaces comprising at least one primary task interface, each of the multiple interfaces presenting at least one content item, the at least one primary task interface being an interface of an application different from applications of rest of the multiple interfaces;
estimate a user engagement level with respect to content items presented via the rest of the multiple interfaces based on the user interaction with the content items across the rest of the multiple interfaces, the user interaction including the user transitioning from one of the multiple interfaces to another one of the multiple interfaces;
determine a degree of user effectiveness with respect to progression toward completing a primary task presented via the primary task interface;
select a content item from the rest of the multiple interfaces based on the user engagement level and the degree of user effectiveness, the content item including information from at least one of the rest of the multiple interface, to which the user transitioned a number of times from the primary task interface; and
control a presentation of the selected content item on an unused portion of at least one of the multiple interfaces, the device caused to select the content based on determining that the degree of user effectiveness with respect to progression toward completing the primary task is below a threshold.

16. The computer program product of claim 15, wherein the interfaces comprises web pages.

17. The computer program product of claim 15, wherein the interfaces comprises apps.

18. The computer program product of claim 15, wherein the device caused to control the presentation of the selected content item comprises the device caused to transform a display of the selected content item from one form to another.

19. The computer program product of claim 15, wherein the user engagement level is estimated at least based on a frequency of navigating to an interface of the rest of the multiple interfaces, time spent per visit to the rest of the multiple interfaces, a degree of user interactions with the rest of the multiple interfaces, and user eye movements and gaze patterns.

20. A system of controlling contents of interfaces, comprising:
at least one hardware processor coupled with at least one memory device, the at least one hardware processor operable to at least:
receive multiple interfaces opened via a computing device, each of the multiple interfaces being where a user has visited at least one time, the multiple interfaces comprising at least one primary task interface, each of the multiple interfaces presenting at least one content item, the at least one primary task interface being an interface of an application different from applications of rest of the multiple interfaces;
estimate a user engagement level with respect to content items presented via the rest of the multiple interfaces based on the user interaction with the content items across the rest of the multiple interfaces, the user interaction including the user transitioning from one of the multiple interfaces to another one of the multiple interfaces; determine a degree of user effectiveness with respect to progression toward completing a primary task presented via the primary task interface;
select a content item from the rest of the multiple interfaces based on the user engagement level and the degree of user effectiveness, the content item including information from at least one of the rest of the multiple interface, to which the user transitioned a number of times from the primary task interface; and
control a presentation of the selected content item on an unused portion of at least one of the multiple interfaces, the at least one hardware processor operable to select the content based on determining that the degree of user effectiveness with respect to progression toward completing the primary task is below a threshold.

* * * * *